(12) United States Patent
Lin

(10) Patent No.: US 7,830,641 B2
(45) Date of Patent: Nov. 9, 2010

(54) TUNNELING MAGNETORESISTIVE (TMR) SENSOR WITH A CO-FE-B FREE LAYER HAVING A NEGATIVE SATURATION MAGNETOSTRICTION

(75) Inventor: Tsann Lin, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 747 days.

(21) Appl. No.: 11/736,521

(22) Filed: Apr. 17, 2007

(65) Prior Publication Data

US 2008/0259507 A1 Oct. 23, 2008

(51) Int. Cl.
*G11B 5/33* (2006.01)
*G11B 5/127* (2006.01)
(52) U.S. Cl. .................................. 360/324.2
(58) Field of Classification Search ............... 360/324.2
See application file for complete search history.

(56) References Cited

U.S. PATENT DOCUMENTS

| 4,236,946 | A | 12/1980 | Aboaf et al. ............... 148/108 |
| 6,724,585 | B2 | 4/2004 | Hayashi ................... 360/324.2 |
| 6,831,312 | B2 | 12/2004 | Slaughter et al. ........... 257/295 |
| 6,831,314 | B2 | 12/2004 | Higo et al. ................. 257/295 |
| 6,844,999 | B2 | 1/2005 | Wang et al. ............. 360/324.12 |
| 7,369,376 | B2 * | 5/2008 | Guo et al. ................ 360/324.2 |
| 2004/0245553 | A1 | 12/2004 | Hosomi et al. ............. 257/295 |
| 2006/0098354 | A1 | 5/2006 | Parkin ..................... 360/324.2 |
| 2006/0141640 | A1 | 6/2006 | Huai et al. ..................... 438/3 |
| 2006/0209590 | A1 * | 9/2006 | Guo et al. ................... 365/158 |
| 2007/0297090 | A1 * | 12/2007 | Gill ............................ 360/123 |
| 2008/0080101 | A1 * | 4/2008 | Mauri et al. ............. 360/324.2 |
| 2008/0144235 | A1 * | 6/2008 | Gill ....................... 360/324.12 |

OTHER PUBLICATIONS

Yoshinori et al. "Ultra-low resistance-area product of 0.4Ω(μm)² and high magnetoresistance above 50% in CoFeB/MgO/CoFeB magnetic tunnel junctions" Applied Physics Letter 2006.
Chen et al. "Interfacial effects on magnetostriction of CoFeB/AlO$_x$/Co junction" Applied Physics Letter 88, 2006.
Nakajima et al. "Magnetoresistance in Magnetic Tunnel Junctions With Amorphous Electrodes" IEEE Transactions on Magnetics. vol. 41, No. 10, Oct. 2005.
Park et al. "Annealing effects on structural and transport properties of rf-sputtered CoFeB/MgO/CoFeB magnetic tunnel junstions" Journal of Applied Physics 99, 2006.

(Continued)

*Primary Examiner*—Brian E Miller
*Assistant Examiner*—Adam B Dravininkas
(74) *Attorney, Agent, or Firm*—Zilka-Kotab, PC

(57) ABSTRACT

A tunneling magnetoresistive (TMR) sensor with a free layer made of a Co—Fe—B alloy is disclosed. The Co—Fe—B free layer has an Fe content of not greater than 10 atomic percent, and a B content of not greater than 10 atomic percent. The free-layer structure can include a first free layer lying on a barrier layer and a second free layer lying on the first free layer. The first free layer is made of an alloy selected from Co—Fe, Co—B and Co—Fe—B alloys, while the second free layer is made of an alloy selected from Co—B and Co—Fe—B alloys.

13 Claims, 9 Drawing Sheets

OTHER PUBLICATIONS

Cardoso et al. "Characterization of CoFeB electrodes for tunnel junctions" Journal of Applied Physics 97, 2005.

Wang et al. "Magnetostriction effect of amorphous CoFeB thin films and application in spin-dependent tunnel junctions" Journal of Applied Physics 97, 2005.

Bilzer et al. "Study of the dynamic magnetic properties of soft CoFeB films" Journal of Applied Physics 100, 2006.

Lee et al. "Giant tunnel magnetoresistance and high annealing stability in CoFeB/MgO/CoFeB magnetic tunnel junctions with synthetic pinned layer" http://arxiv.org/ftp/cond-mat/papers/0606/0606503.pdf.

Tsunekawa et al. "Giant tunneling magnetoresistance effect in low-resistance CoFeB/MgO(001)/CoFeB magnetic tunnel junctions for read-head applications" Applied Physics Letter 87, 2005.

Paluskar et al. "$Co_{72}Fe_{20}B_8$: Structure, magnetism and tunneling spin polarization" Journal of Applied Physics 99, 2006.

* cited by examiner

TUNNELING MAGNETORESISTIVE (TMR) SENSOR WITH A CO-FE-B FREE LAYER HAVING A NEGATIVE SATURATION MAGNETOSTRICTION

RELATED APPLICATION

The present application is related to a commonly assigned patent application Ser. No. 11/611,828, entitled A CURRENT-PERPENDICULAR-TO-PLANE SENSOR WITH DUAL KEEPER LAYERS, filed on Dec. 15, 2006, which is hereby incorporated by reference in its entirety.

FIELD OF THE INVENTION

The present invention relates to a current-perpendicular-to-plane (CPP) tunneling magnetoresistive (TMR) sensors and more particularly to a TMR sensor having a Co—Fe—B free layer having a negative saturation magnetostriction, $\lambda_S$.

BACKGROUND OF THE INVENTION

The heart of a computer is a non-volatile storage device that is referred to as a magnetic disk drive. The magnetic disk drive includes a magnetic disk, and write and read heads. The write and read heads are supported by a slider that is mounted on a suspension arm. When the magnetic disk rotates, an actuator swings the suspension arm to place the write and read heads over selected circular tracks on the surface of the rotating magnetic disk. An airflow generated by the rotation of the magnetic disk causes an air-bearing surface (ABS) of the slider to fly at a very low elevation (fly height) over the surface of the rotating magnetic disk. The write and read heads write magnetic transitions to and read magnetic transitions from the rotating magnetic disk, respectively. Processing circuitry connected to the write and read heads then operates according to a computer program to implement writing and reading functions.

The write head includes a coil embedded in an insulation stack that is sandwiched between main and auxiliary poles. The main and auxiliary poles are magnetically coupled at a back gap and are coated with an overcoat. A write current conducted through the coil induces a magnetic flux in the main pole that causes a magnetic field to write the aforementioned magnetic transitions to the rotating magnetic disk.

The read head has traditionally included a current-in-plane (CIP) giant magnetoresistive (GMR) sensor. The GMR sensor includes a magnetically pinned layer and a magnetically free layer separated by an electrically conductive nonmagnetic spacer layer. The relative orientations of the magnetizations of the pinned and free layers change the electrical resistance of the GMR sensor based on the spin-dependent scattering of conduction electrons in the GMR sensor.

Recently, in order to improve the performance of read heads at very small track widths, researchers have focused on the development of current-perpendicular-to-plane (CPP) GMR and tunneling magnetoresistive (TMR) sensors. The TMR sensor also includes a magnetically pinned layer and a magnetically free layer, but both are separated by an electrically insulating nonmagnetic barrier layer. The relative orientations of the magnetizations of the pinned and free layers change the electrical resistance of the TMR sensor based on the spin-dependent tunneling of conduction electrons through the barrier layer.

In order for the TMR sensor to operate stably at very small track widths, it is desired that the free layer has a negative, or at least zero, saturation magnetostriction, $\lambda_S$. After receiving compressive stresses induced by mechanical lapping in the fabrication process of the write and read heads, a free layer with a negative $\lambda_S$ longitudinally biases its own magnetization in a longitudinal direction parallel to the ABS in the absence of an external magnetic field. Thus, a free layer only needs low longitudinal bias fields provided by neighboring hard-magnetic films for stable read performance, thereby causing high read sensitivity. In contrast, a free layer with a positive $\lambda_S$ transversely biases its own magnetization in a transverse direction perpendicular to the ABS in the absence of an external magnetic field. Thus, a free layer with a positive $\lambda_S$ requires high longitudinal bias fields for stable read performance, thereby causing low read sensitivity.

Thus, it is important to use a free layer with a desired negative $\lambda_S$ to ensure stable read performance. The most extensively explored TMR sensor with pinned and free layers made of ferromagnetic 60% Co-20% Fe-20% B (in atomic percent) alloys separated by an barrier made of a thin $MgO_X$ film, exhibits superior TMR properties. However, its free layer exhibits very highly positive $\lambda_S$ mainly due to the high Fe content. For example, in prior art, this TMR sensor exhibits a TMR coefficient, $\Delta R_T/R_J$, (where $R_J$ is a minimum junction resistance measured when the magnetizations of the pinned and free layers are parallel to each other, and $R_J+\Delta R_T$ is a maximum junction resistance measured when the magnetizations of the pinned and free layers are antiparallel to each other) of as high as 138% at a junction resistance-area product, $R_J A_J$, (where $A_J$ is a junction area) of as low as 2.4 $\Omega\text{-}\mu m^2$, after annealing for 2 hour at 360° C. in 8,000 Oe in a high vacuum oven.

It is believed that the high Fe and B contents cause two microstructural effects. First, during depositions on a wafer, the Co—Fe—B pinned layer grows with an amorphous phase, so that the Mg—O barrier layer can grow freely with its {001} crystalline planes in parallel to the wafer surface (or with a <001> crystalline texture). Subsequently, the Co—Fe—B free layer also grows with an amorphous phase. Second, during annealing, Co—Fe—B polycrystalline grains with a body-center-cubic (bcc) <001> crystalline texture nucleate at two Mg—O interfaces, and then grow in the entire Co—Fe—B pinned and free layers. This crystallization results in an epitaxial relationship among the pinned, barrier and free layers, which facilitates coherent spin polarization through the two Mg—O interfaces. As a result, this TMR sensor exhibits superior TMR properties. However, this TMR sensor exhibits a $\lambda_S$ of more than $6\times10^{-6}$, not only due to the high Fe content, but also due to the impractically high temperature which causes unwanted interfacial mixing and inevitably deteriorates overall ferromagnetic properties. Such an impractical high temperature is considered to be crucial for the desired transformation from the amorphous phase (formed after deposition due to the high B content) to the polycrystalline phase.

Therefore, there is a need for the free layer to exhibit a negative $\lambda_S$, while still facilitating the TMR sensor to exhibit superior TMR properties. In addition, to ensure manufacturability, this TMR sensor with such a free layer must be fabricated without using an impractical high temperature.

SUMMARY OF THE INVENTION

The present invention provides a tunneling magnetoresistive (TMR) sensor with a free layer made of a Co—Fe—B alloy. After annealing at a temperature of less than 300° C., the Co—Fe—B free layer exhibits a negative or zero saturation magnetostriction, $\lambda_S$, while the TMR sensor exhibits superior TMR properties.

In a preferred embodiment of the present invention, the Co—Fe—B free layer has an Fe content of not greater than 10 atomic percent (preferably about 4 atomic percent), and a B content of not greater than 10 atomic percent (preferably about 10 atomic percent). After annealing for 5 hours at a temperature as low as 240° C. this free layer exhibits a negative saturation magnetostriction, $\lambda_S$, while the TMR sensor exhibits a very high TMR coefficient, $\Delta R_T/R_J$ (where $R_J$ is a minimum junction resistance measured when the magnetizations of the pinned and free layers are parallel to each other, and $R_J+\Delta R_T$ is a maximum junction resistance measured when the magnetizations of the pinned and free layers are antiparallel to each other) at a very low junction resistance-area product, $R_JA_J$ (where $A_J$ is a junction area).

In an alternative embodiment of the present invention, a free-layer structure is used in place of the Co—Fe—B free layer. The free-layer structure includes a first free layer lying on a barrier layer and a second free layer lying on the first free layer. The first free layer is made of an alloy selected from Co—Fe, Co—B and Co—Fe—B alloy systems, while the second free layer is made of an alloy selected from Co—B and Co—Fe—B alloy systems. The first free layer has an Fe content of not greater than 10 atomic percent (preferably about 4 atomic percent), and a B content of not greater than 10 atomic percent (preferably about 10 atomic percent). The second free layer has an Fe content of not greater than 20 atomic percent (preferably about 8 atomic percent), and a B content of not greater than 20 atomic percent (preferably about 20 atomic percent). After annealing for 2 to 20 hours at a temperature ranging from 220° C. up to 300° C., the free-layer structure exhibits a negative saturation magnetostriction, $\lambda_S$, while the TMR sensor exhibits a very high TMR coefficient, $\Delta R_T/R_J$ at a very low junction resistance-area product, $R_JA_J$. By adjusting the compositions and thicknesses of the first and second Co—Fe—B free layers, it is possible to "tune" to any desired value of saturation magnetostriction, $\lambda_S$, in the range of $-1\times10^{-5}<\lambda_S<0$ (preferably $-2\times10^{-6}<\lambda_S<0$).

These and other features and advantages of the invention will be apparent upon reading of the following detailed description of preferred embodiments taken in conjunction with the figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings, which are not to scale.

DETAILED DESCRIPTION OF THE INVENTION

The following is a description of various embodiments presently contemplated for carrying out this invention. This description is made for the purpose of illustrating the general principles of this invention and is not meant to limit the inventive concepts claimed herein.

Figure 1:
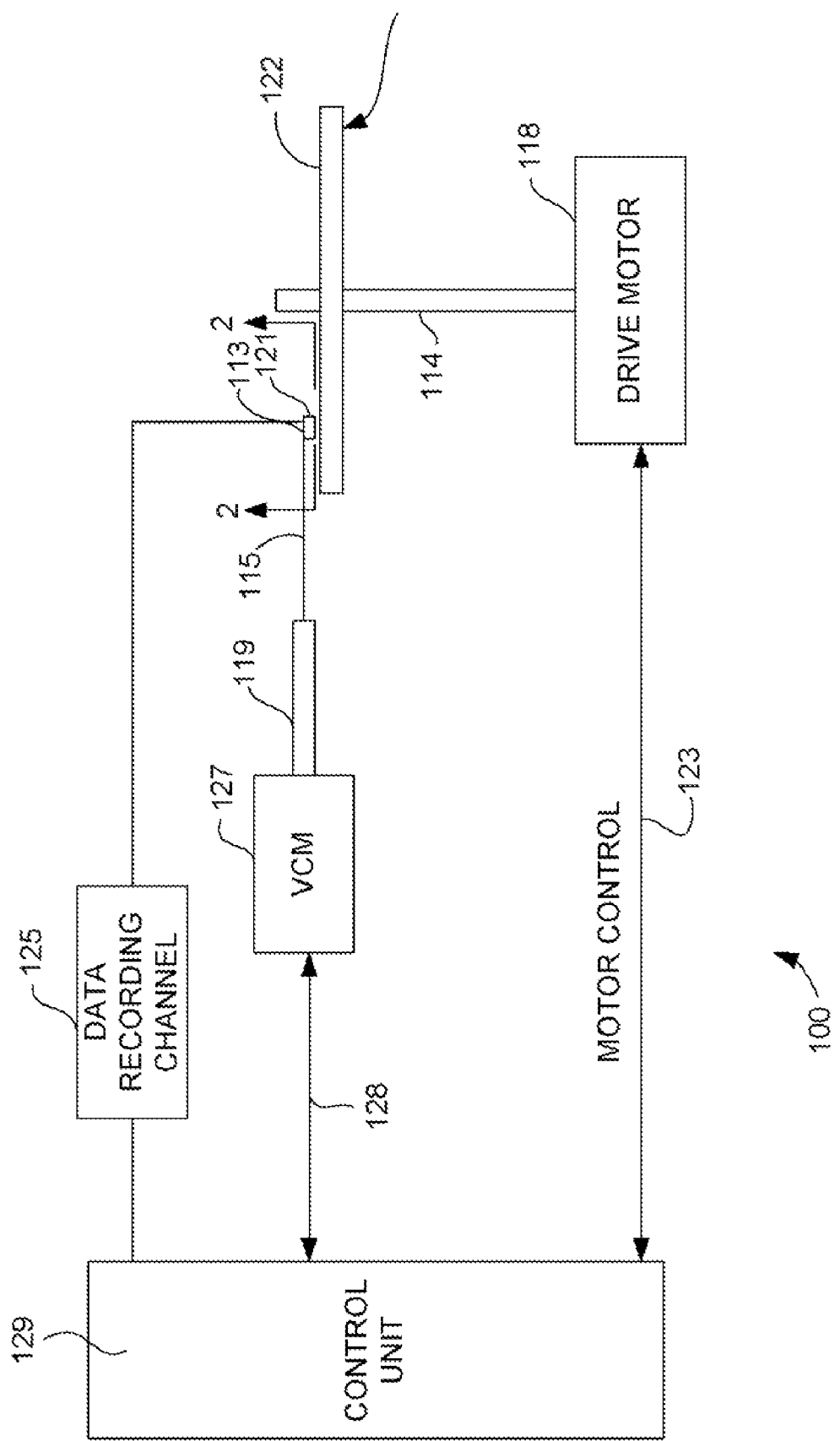
FIG. 1 is a schematic illustration of a magnetic disk drive in which this invention might be embodied.

Referring now to FIG. 1, there is shown a magnetic disk drive 100 embodying this invention. As shown in FIG. 1, at least one rotatable magnetic disk 112 is supported on a spindle 114 and rotated by a disk drive motor 118. The magnetic recording is performed on each magnetic disk 112.

At least one slider 113 is positioned near the magnetic disk 112, each slider 113 supporting write and read heads 121. As the magnetic disk 112 rotates, the slider 113 moves radially in and out over the disk surface 122 so that the write and read heads 121 may access different tracks of the magnetic disk 112. Each slider 113 is attached to an actuator arm 119 by way of a suspension 115. The suspension 115 provides a slight spring force, which biases the slider 113 against the disk surface 122. Each actuator arm 119 is attached to an actuator means 127, which may be a voice coil motor (VCM). The VCM comprises a coil movable within a fixed magnetic field, the direction and speed of the coil movements being controlled by the current signals supplied by a control unit 129 to the coil.

During operation of the magnetic disk drive 100, the rotation of the magnetic disk 112 generates an air bearing between the slider 113 and the disk surface 122, which exerts an upward force or lift on the slider 113. The air bearing thus counter-balances the slight spring force of the suspension 115 and supports the slider 113 off and slightly above the disk surface 122 by a small, substantially constant spacing during operation.

The various components of the magnetic disk drive 100 are controlled in operation by control signals generated by the control unit 129, such as access control signals and internal clock signals. Typically, the control unit 129 comprises logic control circuits, storage means and a microprocessor. The control unit 129 generates control signals to control various operations such as drive motor control signals on line 123 and head position and seek control signals on line 128. The control signals on line 128 provide desired current profiles to optimally move and position the slider 113 to the desired data track on the magnetic disk 112. Write and read signals are communicated to and from write and read heads 121 by way of a recording channel 125.

Figure 2:
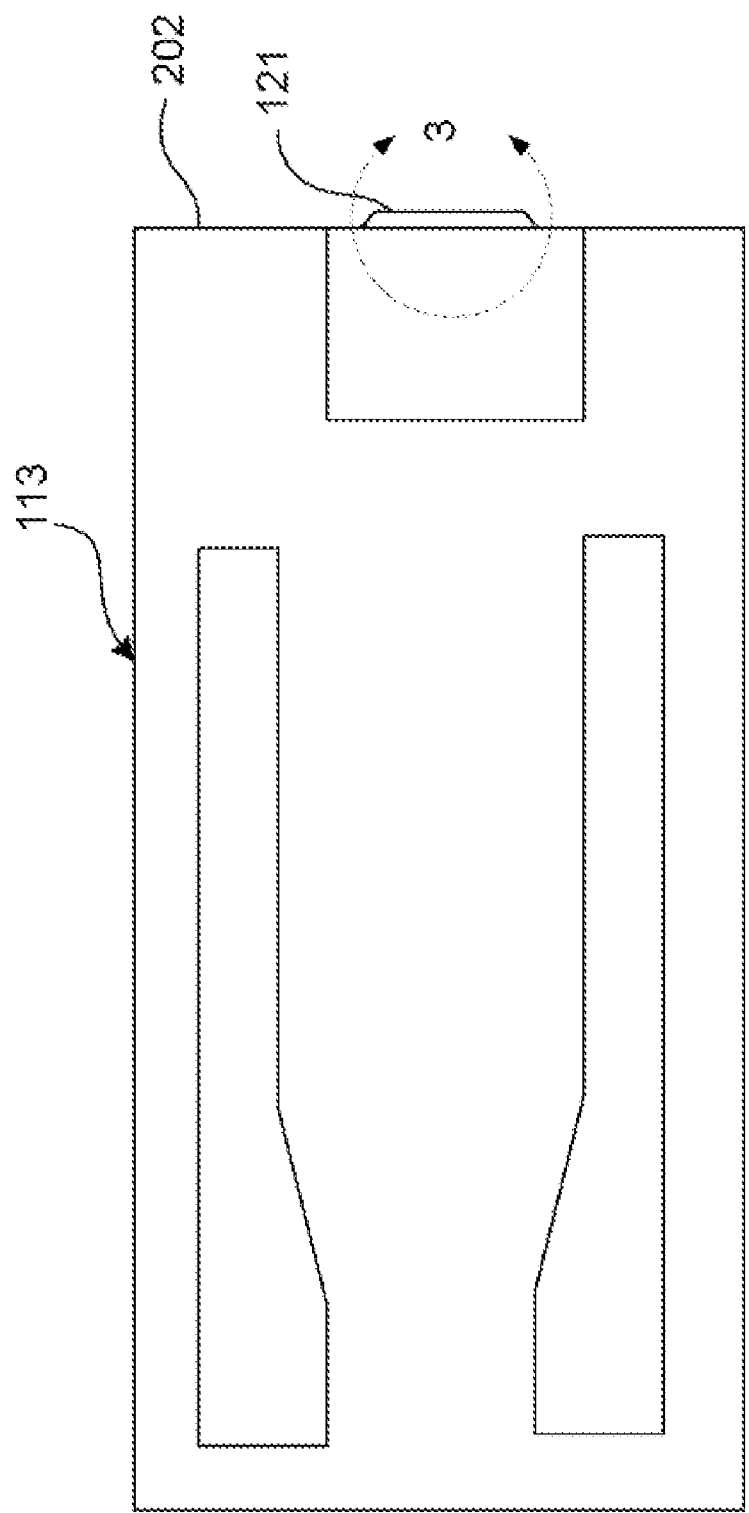
FIG. 2 is an ABS view of a slider, taken from line 2-2 of FIG. 1, illustrating the location of write and read heads thereon.

With reference to FIG. 2, the orientation of the write and read heads 121 in the slider 113 can be seen in more detail. FIG. 2 is an ABS view of the slider 113, and as can be seen, the write and read heads 121 are located at a trailing edge 202 of the slider 113. The above description of a typical magnetic disk drive 100 and the accompanying illustration of FIG. 1 are for representation purposes only. It should be apparent that the magnetic disk drive may contain a large number of magnetic disks and actuators, and each actuator may support a number of sliders.

Embodiment Comprising a Free Layer

Figure 3:
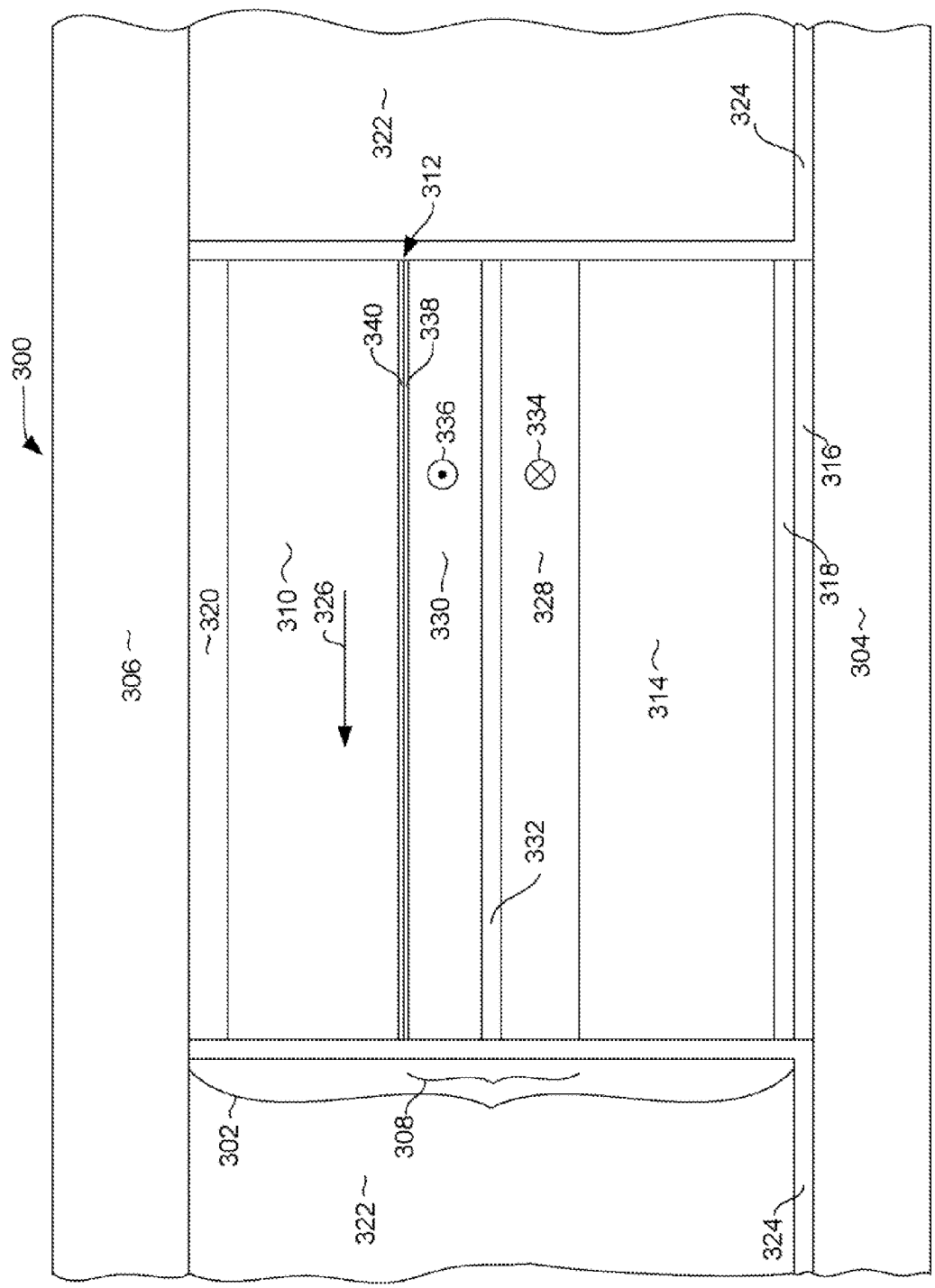
FIG. 3 is an ABS view of a TMR sensor according to an embodiment of the invention taken from circle 3 of FIG. 2.

With reference now to FIG. 3, a read head 300 including a tunneling magnetoresistive (TMR) sensor 302 according to an embodiment of the invention is shown. The read head 300 includes the TMR sensor 302 sandwiched between a pair of electrically conductive leads or electrodes 304, 306. The electrodes 304, 306 can be made of 1 μm thick ferromagnetic Ni—Fe alloys that function as magnetic shields, as well as electrically conductive leads.

For measuring TMR properties with a CIP technique, the TMR sensor 302 sandwiched between another pair of electrodes was fabricated on a $SiO_X$-coated Si substrate (where the subscript, x, indicates that the oxide may be, but need not be stoichiometric). The first electrode may comprise a 3 nm thick Ta film under a 45 nm thick $CuN_X$ film under a 3 nm thick Ta film capped by a 45 nm thick $CuN_X$ film (where the subscript, x, indicates the presence of nitrogen in the film, but not necessarily in stoichiometric amounts). The second electrode may comprise a 45 nm thick Cu film under a 6 nm thick Ru film. Note that theses electrodes are too thick for incorporation into the read head 300, but remain suitable only for measurements of the TMR properties with the CIP technique. In the following discussion, TMR properties illustrated in FIGS. 4 through 7, and 9, were measured on the $SiO_X$-coated Si substrate with these electrodes.

The TMR sensor 302 includes a pinned-layer structure 308 and a free layer 310. The free layer 310 is separated from the pinned-layer structure 308 by an electrically insulating nonmagnetic, barrier-layer structure 312. A pinning layer 314 made of an antiferromagnetic alloy can be used beneath the pinned-layer structure 308 for pinning the magnetizations of the ferromagnetic layers in the pinned-layer structure 308, and will be described in greater detail herein below. Seed layers may be used beneath the pinning layer 314 to initiate a desired grain growth in the layers above. For example, as shown in FIG. 3, the TMR sensor 302 can comprise first and second seed layers 316, 318. The first seed layer 316 can also act as an adhesion layer made of, for example, a Ta film, and the second seed layer 318 can be made of, for example, a Ru film. Alternatively, the second seed layer 318 can be made of a Ni—Cr—Fe alloy. To facilitate the grain growth, a third seed layer (not shown) made of a Ni—Fe alloy can be used. Additionally, a cap layer 320 made of, for example, a Ta film, can also be used on top of the free layer 310 to protect the underlying layers of the TMR sensor 302 during the fabrication process of the write and read heads.

With continued reference to FIG. 3, the read head 300 can also include first and second longitudinal bias layers 322 made of a hard-magnetic Co—Pt or Co—Pt—Cr alloy. First and second electrically insulating nonmagnetic layers 324 separate the longitudinal bias layers 322 from the TMR sensor 302 and from at least one of the electrodes, such as the electrode 304, in order to prevent portions of the sense current from being shunted through the longitudinal bias layers 322. The longitudinal bias layers 322 can be magnetized to provide a longitudinal bias field that, through the mechanism of magnetostatic coupling with the free layer 310, causes the magnetization 326 of the free layer 310 to be biased in a desired, longitudinal direction.

With reference still to FIG. 3, the pinned-layer structure 308 can include a ferromagnetic, keeper layer 328 separated from a ferromagnetic, reference layer 330 by an nonmagnetic, antiparallel-coupling layer 332. The keeper and reference layers 328, 330 can be made of, for example, a Co—Fe alloy and a Co—Fe—B alloy, respectively. The antiparallel-coupling layer 332 can be made of a Ru film with a thickness selected at the first or second peak of an RKKY (Ruderman-Kittel-Kasuya-Yosida) antiparallel-coupling curve, in order to facilitate strong antiparallel coupling between the keeper and reference layers 328, 330. The pinning layer 314 can be made of, for example, an Ir—Mn or Ir—Mn—Cr alloy. The keeper layer 328 is exchange coupled with the pinning layer 314, which strongly pins the magnetization of the keeper layer 328 in a desired transverse direction perpendicular to the ABS as indicated by an arrow-tail symbol 334. The strong antiparallel coupling between the keeper and reference layers 328, 330 strongly pins the magnetization of the reference layer 330 in a direction, as indicated by arrowhead symbol 336, antiparallel to the transverse direction.

With continued reference to FIG. 3, the barrier-layer structure 312 may comprise a first barrier layer 338 and a second barrier layer 340, both of which can be made of very thin $MgO_X$ films, where x indicates that the oxide need not be stoichiometric. The total thickness of the barrier-layer structure 312 can be about 1 nm. The amounts of oxygen in the first and second $MgO_X$ barrier layers are independently tuned to minimize the oxygen penetration into the reference layer 330 and the free layer 310, thereby maximizing the TMR coefficient of the TMR sensor 302. The $MgO_X$ barrier layer may be deposited by a variety of methods, for example: by direct-current (DC) magnetron sputtering reactively in an oxygen atmosphere from a Mg target, or by radio-frequency (RF) magnetron sputtering from a $MgO_X$ target. Embodiments of the present invention are by no means limited to any particular method of depositing the $MgO_X$ barrier layer.

For embodiments of the invention described herein, further oxygen treatments (OTs) are applied to the $MgO_X$ barrier-layer structure 312, after deposition of the first and second $MgO_X$ barrier layers 338, 340, but before the deposition of the free layer 310. In these oxygen treatments (OTs), the first and second $MgO_X$ barrier layers 338, 340 are exposed to an oxygen gas flowing at a constant rate for up to 4 minutes in a deposition module. These oxygen treatments (OTs) have been found to suppress oxygen activity during the subsequent deposition of the free layer, thus improving magnetic and TMR properties of the TMR sensor 302.

The free layer 310 is made of a Co—Fe—B alloy having Fe and B contents that are carefully controlled so that the free layer 310 has a zero or negative saturation magnetostriction, $\lambda_S$, while being capable of facilitating the TMR sensor to exhibit superior TMR properties after annealing at a relatively low temperature of less than 300° C. The Co—Fe—B free layer 310 preferably has an Fe content of not greater than 10 atomic percent and a B content not greater than 10 atomic percent.

The TMR sensor 302, as shown in FIG. 3, comprises 1 nm thick electrically insulating $MgO_X$ barrier layer 312. The Ta adhesion layer 316 can be 3 nm thick, and the Ru seed layer 318 can be 1.6 nm thick. The pinning layer 314 can be a 25.2% Ir-70.6% Mn-4.2% Cr alloy with a thickness of 6 nm. (Note that all compositions cited herein are in units of atomic percent.) The keeper layer 328 can be made of a 77.5% Co-22.5% Fe alloy with a thickness of 2 nm. The antiparallel-coupling layer 332 can be made of a Ru film with a thickness of 0.8 nm. The reference layer can be made of a 52.6% Co-33.1% Fe-14.3% B alloy with a thickness of 1.9 nm. As mentioned above, the free layer 310 can be made of a Co—Fe—B alloy with a thickness of 2.7 nm. The cap layer 320 can be made of a Ta film with a thickness of 6 nm. The read head 300 can be annealed for 5 hours at a temperature of less than 300° C. in a 50,000 Oe magnetic field in a high-vacuum oven.

In order to prevent the Co—Fe keeper layer 328 from exhibiting unwanted hysteretic magnetization rotations caused by high coercivity. $H_C$, a Pt—Mn pinning layer used in the prior art is replaced by the Ir—Mn—Cr pinning layer 314. In order for the Ir—Mn—Cr pinning layer to exhibit strong antiferromagnetism, the Ru seed layer 318 is added to facilitate the formation of a preferred crystalline texture wherein the face-centered-cubic (fcc) {111} crystalline planes in the Ir—Mn—Cr pinning layer 314 are oriented parallel to the interface between the pinning and reference layers 314, 318. As a result, exchange coupling between the Ir—Mn—Cr pinning layer 314 and the Co—Fe keeper layer 328 induces a uniaxial anisotropy field, $H_{UA}$, much higher, and coercivity. $H_C$, much lower than those between the Pt—Mn pinning and Co—Fe keeper layers. The high $H_{UA}$ ensures rigid pinning, while the low $H_C$ minimizes unwanted hysteretic rotations of magnetization.

In order to prevent the deterioration of the ferromagnetic properties of the Co—Fe keeper layer 328, Co—Fe—B reference layer 330, and Co—Fe—B free layer 310, the annealing temperature as high as 360° C., used in the prior art, is substantially decreased to below 300° C. in the present invention. As a result, the crystallization of the amorphous Co—Fe—B alloy into a polycrystalline microstructure in the reference and free layers 330, 310 may not occur. Consequently, after annealing for 5 hours at 285° C., the TMR sensor 302 with 60% Co-20% Fe-20% B reference and free layer 330, 310 (used in the prior art) exhibits $\Delta R_T/R_J$ of as low as 88.6% at $R_JA_J$ of 3.4 $\Omega\mu m^2$, while exhibiting $\lambda_S$ of as high as +3.6×10$^{-6}$.

As mentioned above, a free layer having a positive saturation magnetostriction, $\lambda_S$, would not be viable since its magnetization is biased in an undesirable transverse direction perpendicular to the ABS, after mechanical lapping. One way to reduce $\lambda_S$ might be by depositing a Ni—Fe or Co—Fe—B—Ni alloy on top of the Co—Fe—B free layer 310. However, it has been found that with such a second free layer containing Ni for reducing $\lambda_S$, $\Delta R_T/R_J$ substantially decreases from 88.6% to below 24% at $R_JA_J$ of approximately 3.4 $\Omega\mu m^2$. Thus, it is suspected that undesirable Ni diffusion into the Co—Fe—B first free layer substantially deteriorates the TMR properties.

However, in the present invention, it has been found that the necessary negative $\lambda_S$ and high $\Delta R_T/R_J$ can be simultaneously attained through the use of the Co—Fe—B alloy as the free layer 310. This Co—Fe—B free layer 310 has an Fe content of not greater than 10 atomic percent and a B content of not greater than 10 atomic percent. By substantially decreasing the Fe and B contents of the Co—Fe—B free layer 310 to far below 20 atomic percent, the Co—Fe—B free layer 310 can exhibit very negative $\lambda_S$, as described below in greater detail. In addition, it is surprising to find that the annealing temperature can be substantially decreased to far below 300° C. for the Co—Fe—B free layer 310 to facilitate the TMR sensor 302 to still exhibit high $\Delta R_T/R_J$. This result is not expected based on the teachings of prior art literature, and is, therefore, an unexpected result.

In particular, in order for the Co—Fe—B free layer 310 to exhibit overall good soft ferromagnetic properties (such as a low easy-axis coercivity, a nearly zero hard-axis coercivity, a low uniaxial anisotropy field, a ferromagnetic coupling field, etc.), in addition to the desired negative $\lambda_S$, and for the TMR sensor to exhibit a high TMR coefficient, deposition parameters of the $MgO_X$ barrier layer and Ta cap layers are substantially tuned. In this embodiment, the $MgO_X$ barrier layer is formed by reactively sputtering in an oxygen atmosphere from a Mg target at a power of 100 W and by exposing the $MgO_X$ barrier layer to an oxygen gas flowing at a constant rate for about four minutes, while the Ta cap layer is deposited at a power of 200 W. By ensuring oxygen saturation on the $MgO_X$ barrier layer and minimizing mixing at the interface between the Co—Fe—B free layer and Ta cap layer, overall good soft ferromagnetic properties can be attained.

Figure 4:
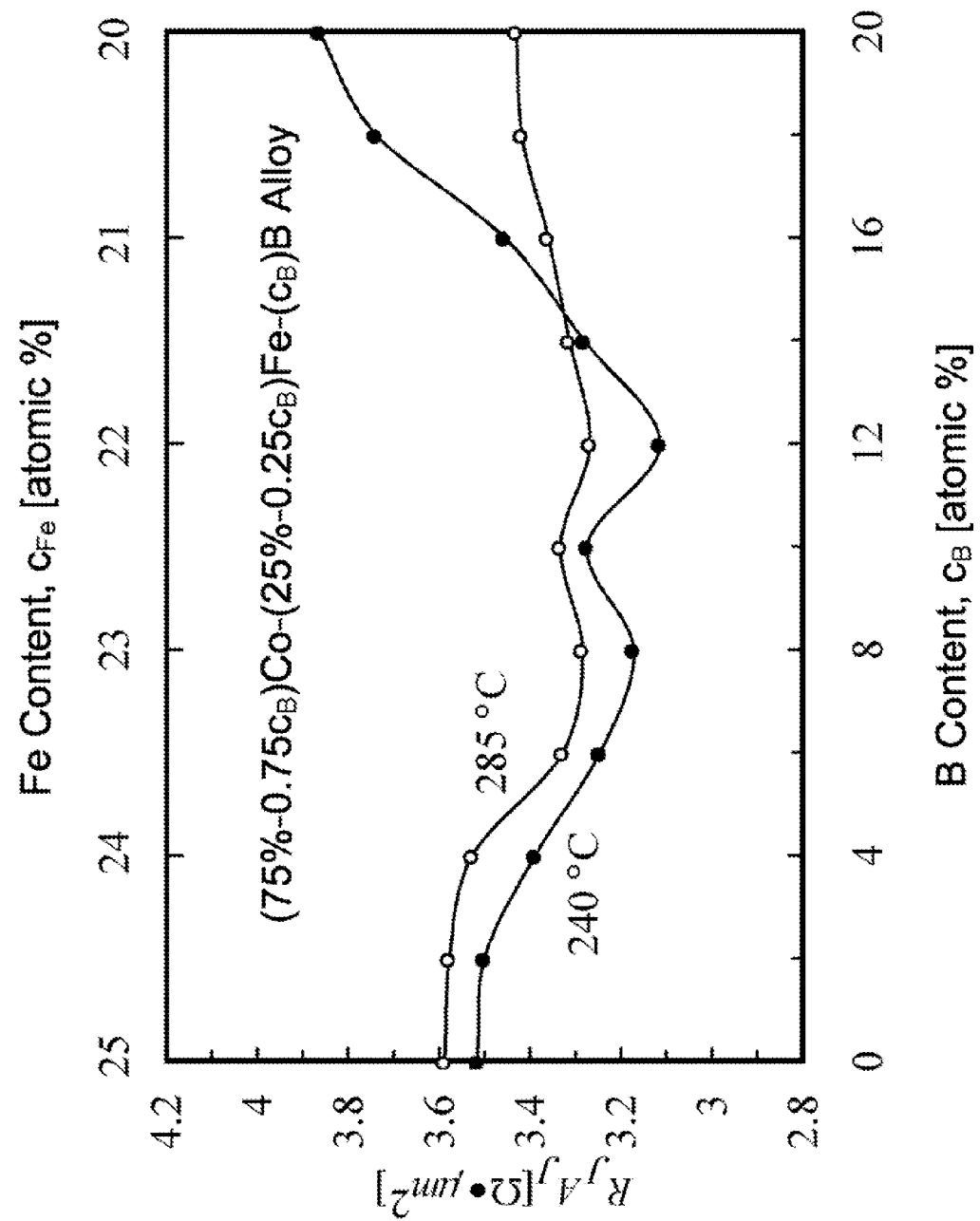
FIG. 4 is a graph illustrating relationships between the B content of a Co—Fe—B free layer and $R_JA_J$ of a TMR sensor annealed at 240° C. and 285° C.
Figure 5:
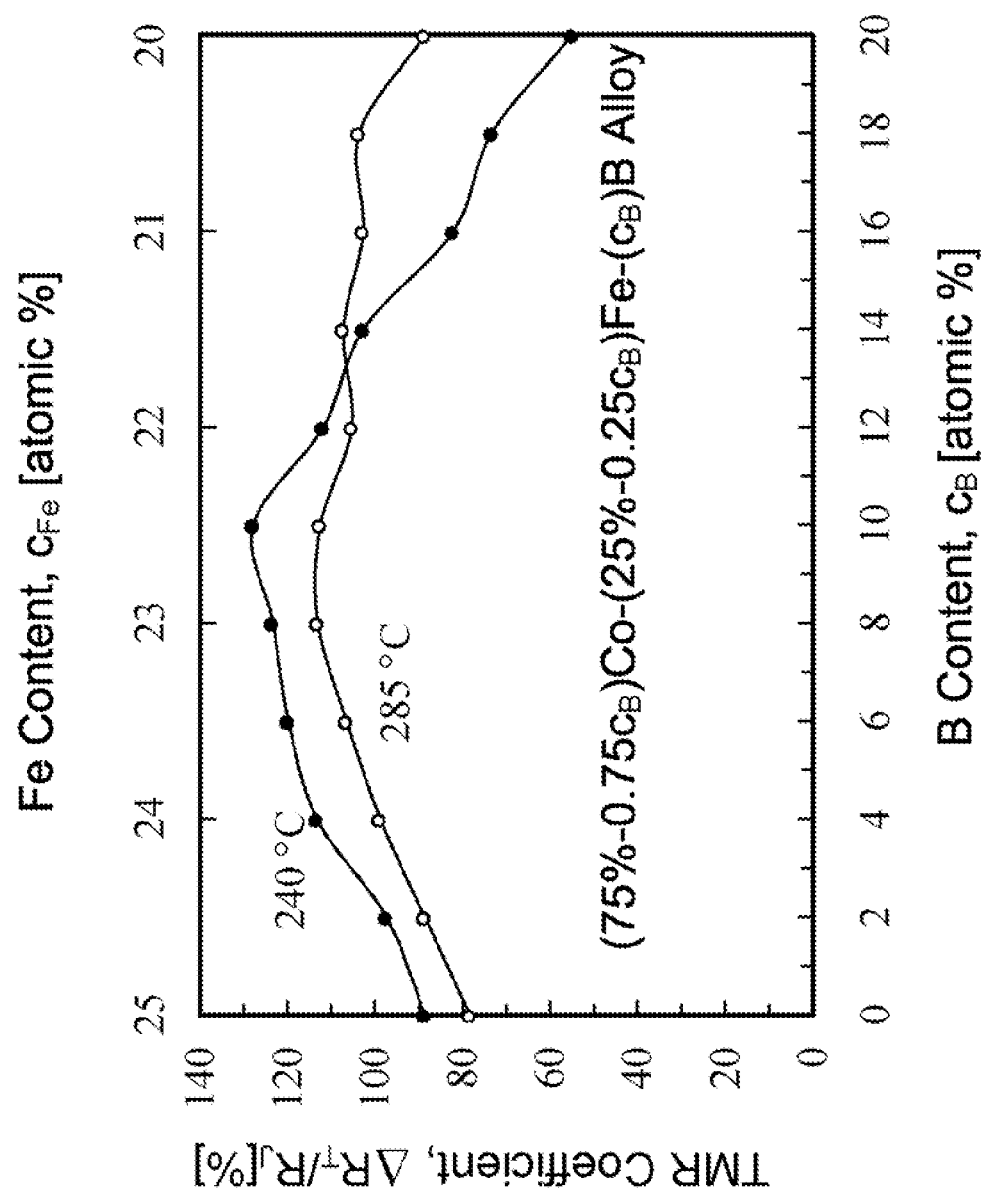
FIG. 5 is a graph illustrating relationships between the B content of a Co—Fe—B free layer and the TMR coefficient of a TMR sensor annealed at 240° C. and 285° C.

FIGS. 4 and 5 show $R_JA_J$ and $\Delta R_T/R_J$, respectively, versus the B content for a TMR sensor 302 with a Co—Fe—B free layer 310 having an Fe content ranging from 20 to 25 atomic percent, and a B content ranging from 0 to 20 atomic percent, the balance being Co, after annealing at 240° C. and 285° C. The Co—Fe—B free layer 310 of varying Fe and B contents were deposited by co-sputtering from two targets having the following compositions: 75% Co-25% Fe and 60% Co-20% Fe-20% B. Thus, the composition of the Co—Fe—B free layer 310 varied as $(75\%-0.75c_B)Co-(25\%-0.25c_B)Fe-c_B B$, where $c_B$ is the B content in atomic percent. For a B content of more than 14 atomic percent, annealing at a lower temperature leads to a higher $R_JA_J$ and a lower $\Delta R_T/R_J$, consistent with those reported in the prior art. However, for the B content of less than 14 atomic percent, annealing at a lower temperature leads to a lower $R_JA_J$ and a higher $\Delta R_T/R_J$. For example, after annealing at as low as 240° C., a TMR sensor with a 67.5% Co-22.5% Fe-10% B free layer exhibits $\Delta R_T/R_J$ of as high as 127.8% at $R_JA_J$ of 3.3 $\Omega\mu m^2$. Thus, a high Fe content plays a more important role than a high B content and a high annealing temperature in exhibiting a high $\Delta R_T/R_J$. However, due to the high Fe content, this Co—Fe—B free layer 310 still inevitably exhibits a high $\lambda_S$. In addition, the addition of at least 4 atomic, percent B into the Co—Fe free layer changes its initially isotropic ferromagnetic properties to anisotropic.

Figure 6:
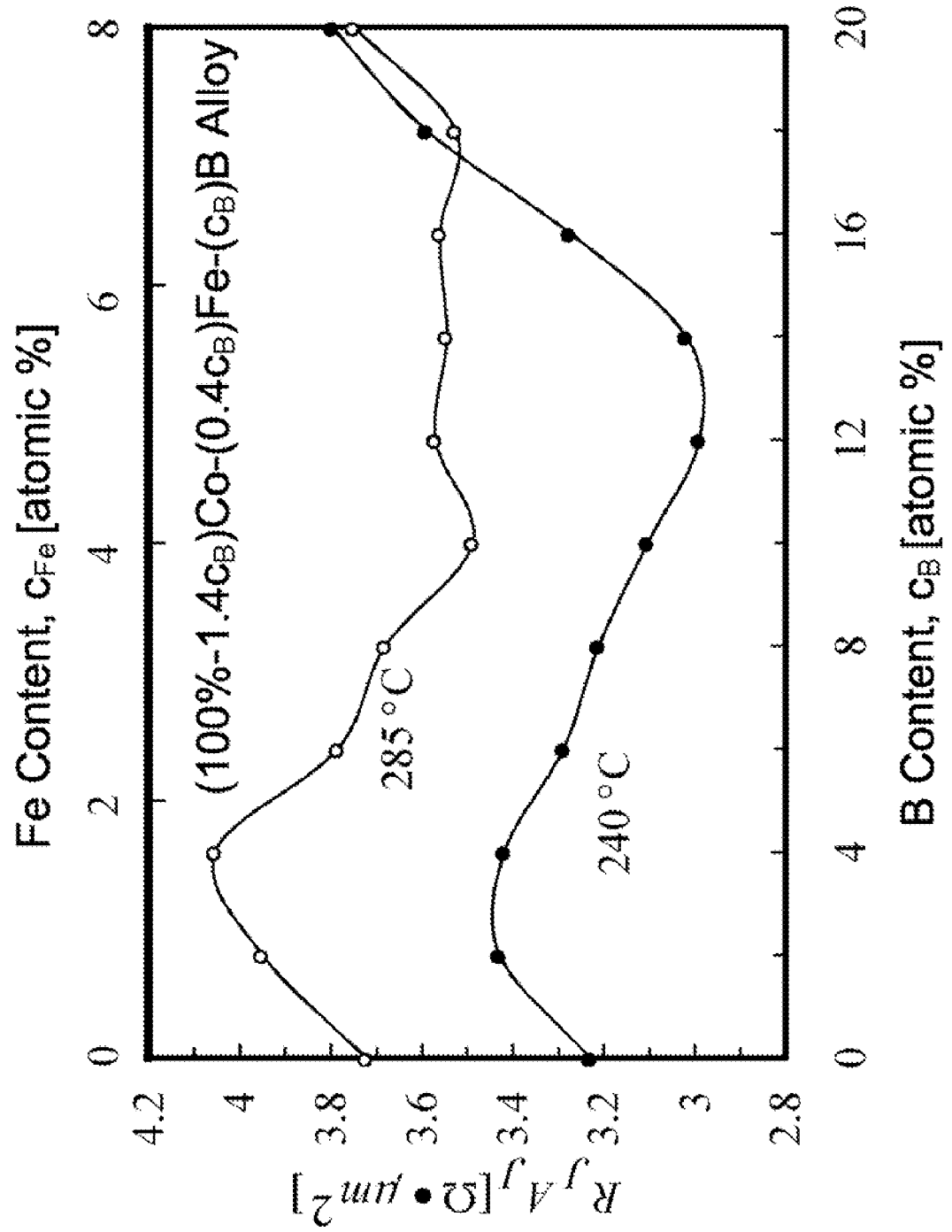
FIG. 6 is another graph illustrating relationships between the B content of a Co—Fe—B free layer and $R_JA_J$ of a TMR sensor annealed at 240° C. and 285° C.
Figure 7:
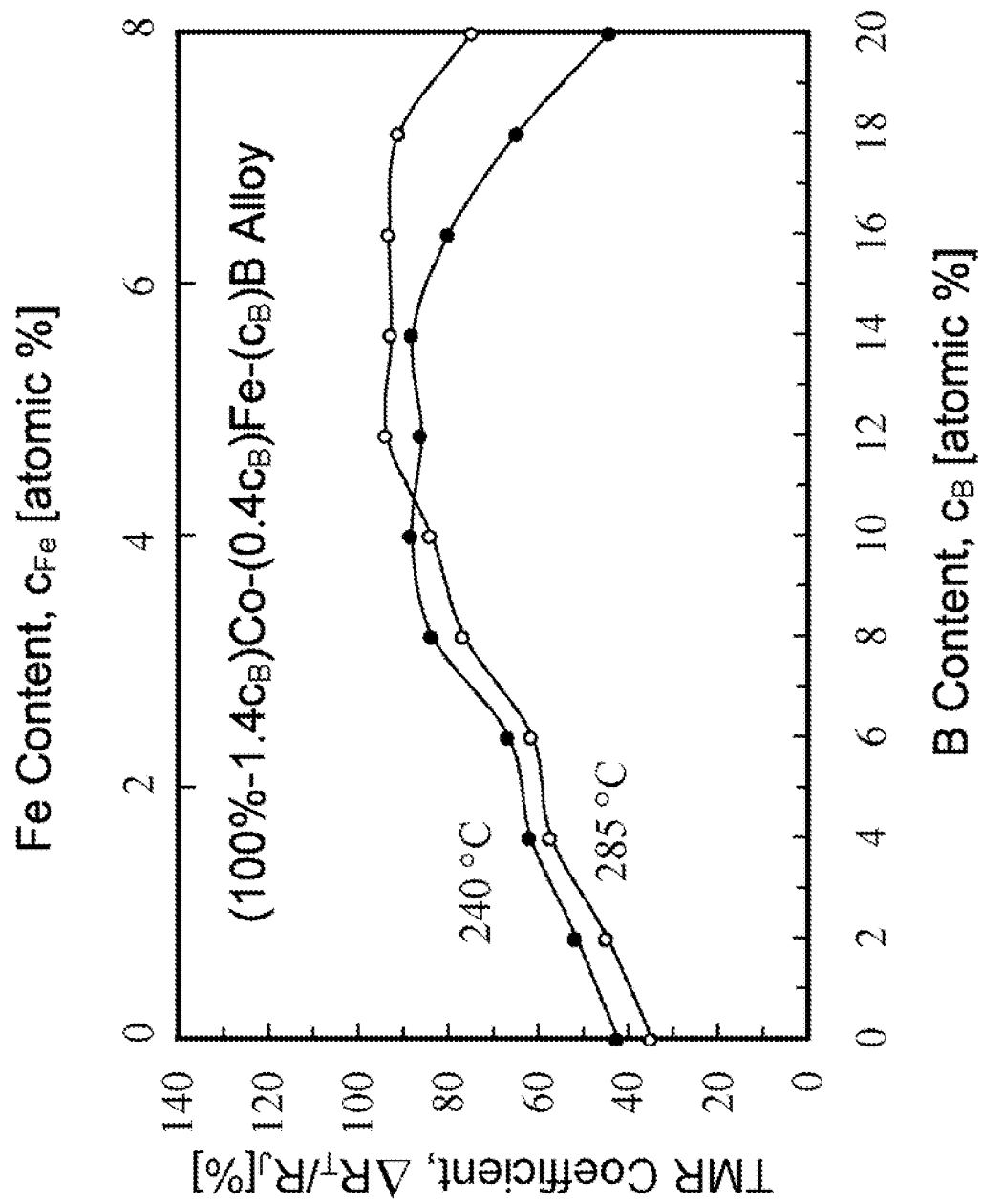
FIG. 7 is another a graph illustrating relationships between the B content of a Co—Fe—B free layer and the TMR coefficient of a TMR sensor annealed at 240° C. and 285° C.

FIGS. 6 and 7 show $R_JA_J$ and $\Delta R_T/R_J$, respectively, versus the B content for a TMR sensor 302 with the Co—Fe—B free layer 310 having an Fe content ranging from 0 to 8 atomic percent, and a B content ranging from 0 to 20 atomic percent, the balance being Co, after annealing at 240° C. and 285° C. The Co—Fe—B free layer 310 of varying Fe and B contents was deposited by co-sputtering from two targets having the following compositions: 100% Co and 72% Co-8% Fe-20% B. Thus, the composition of the Co—Fe—B free layer 310 varied as $(100\%-1.4c_B)Co-(0.4c_B)Fe-c_B B$, where $c_B$ is the B content in atomic percent. Again, the TMR sensor with a low B content only requires annealing at a low temperature to attain good TMR properties. For example, after annealing at as low as 240° C., a TMR sensor with a 86% Co-4% Fe-10% B free layer exhibits $\Delta R_T/R_J$ of as high as 88.1% at $R_JA_J$ of 3.1 $\Omega\mu m^2$. More importantly, with such a low Fe content, the Co—Fe—B free layer 310 exhibits $\lambda_S$ of as low as $-3.6\times10^{-6}$.

In spite of the use of the Ta cap layer 320, which in general causes a substantial increase in $\lambda_S$ due to interfacial mixing with the Co—Fe—B free layer 310, the TMR sensor 302 with specifically selected low Fe and low B contents, as described above, still exhibits an unexpected very low $\lambda_S$, viz. $-3.6\times10^{-6}$. If the cap layer is made of a noble-metal film such as Pt, Rh, Ru, etc., it is expected that $\lambda_S$ will be even more negative. Such a very negative $\lambda_S$ can be finely tuned to a design value around $-2.0\times10^{-6}$, while substantially improving $\Delta R_T/R_J$, as described below.

Alternative Embodiment Comprising a Free-Layer Structure

Figure 8:
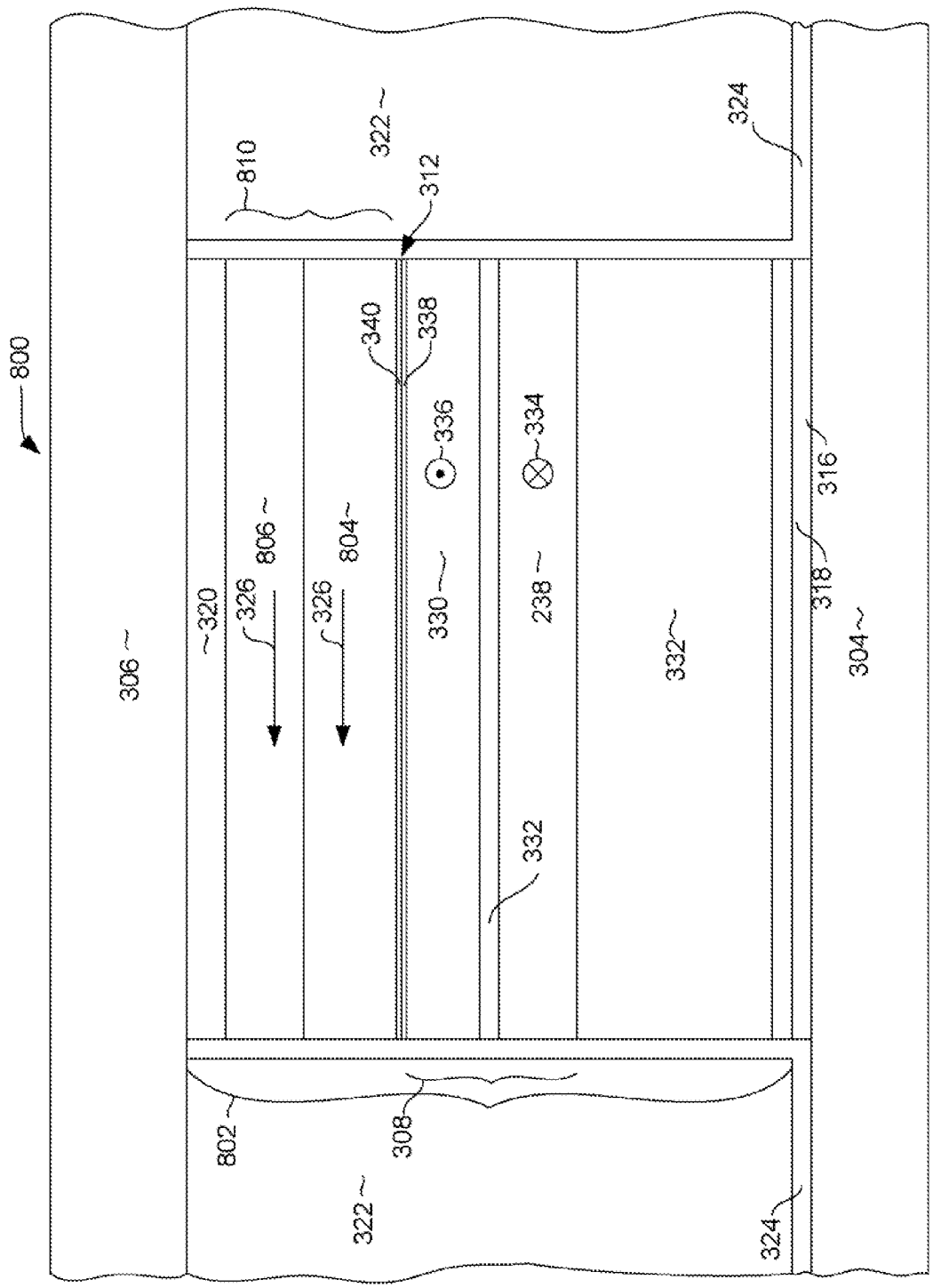
FIG. 8 is an ABS view of a TMR sensor according to an alternative embodiment of the invention.

With reference to FIG. 8, a read head 800 comprising a TMR sensor 802 according to an alternative embodiment of the present invention is shown. The TMR sensor 802 includes a bilayer, free-layer structure 810, which differs from the TMR sensor 302 in that the free layer 310 of the TMR sensor 302 is replaced by a free-layer structure 810 comprising a first free layer 804 and a second free layer 806. The first free layer 804 has an Fe content of not greater than 10 atomic percent and a B content of not greater than 10 atomic percent. The second free layer 806 has an Fe content of not greater than 20 atomic percent and a B content of not greater than 20 atomic percent.

Figure 9:
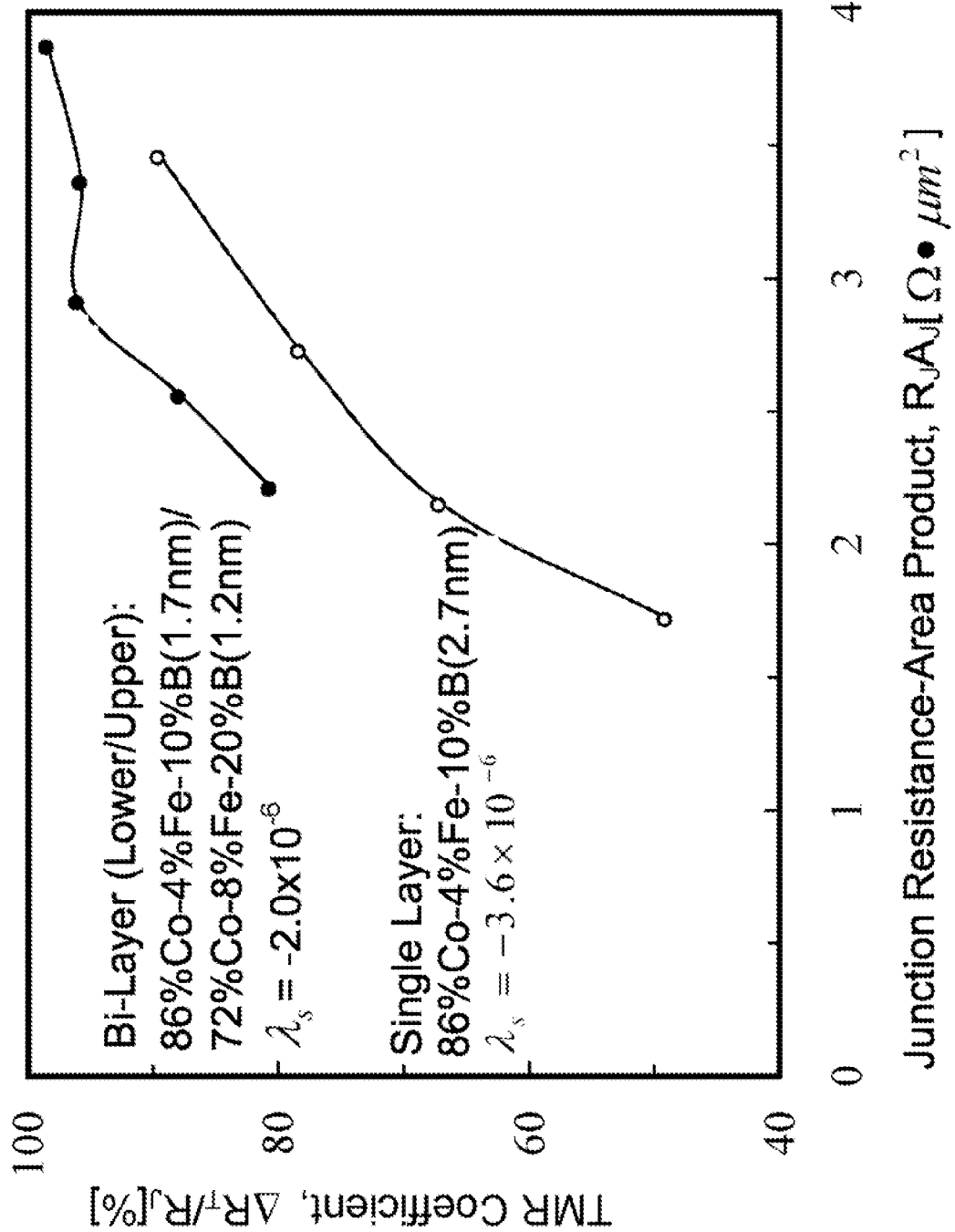
FIG. 9 illustrates the relationships between $R_JA_J$ and the TMR coefficient for alternative embodiments of the present invention comparing TMR sensors having a Co—Fe—B free layer with TMR sensors having a free-layer structure comprising two Co—Fe—B free layers.

FIG. 9 shows $R_J A_J$ versus $\Delta R_T/R_J$, after annealing for 5 hours at 285° C., for the TMR sensor 302 with the free layer 310 made of a 2.7 nm thick 86% Co-4% Fe-10% B alloy and the TMR sensor 802 with the free-layer structure 810 comprising a first free layer 804 made of a 1.7 nm thick 86% Co-4% Fe-10% B alloy, and the second free layer 806 made of 1.2 nm thick 72% Co-8% Fe-20% B alloy. While $\lambda_S$ increases from $-3.6 \times 10^{-6}$ to $-2.0 \times 10^{-6}$, $\Delta R_T/R_J$ increases from 78.3% to 87.9% at $R_J A_J$ of about 2.7 $\Omega \mu m^2$. With such a desired negative $\lambda_S$, the free-layer structure 810 can stabilize itself in a longitudinal direction parallel to the ABS. As a result, only a low longitudinal bias field provided by the neighboring hard-magnetic films is needed for stable read performance; and thus, read sensitivity can be improved.

The saturation magnetostriction $\lambda_S$ of the Co—Fe—B free layers as described in this invention is originally expected to decrease with decreasing the Fe content of the Co—Fe—B free layer, but is not expected to substantially decrease to a very negative value. Since interfaces of a very thin ferromagnetic film have been known to dominantly contribute to $\lambda_S$, it is speculated that the oxygen exposure on the $MgO_X$ barrier layer and the use of a low target power for the deposition of the Ta cap layer may dominantly lead to the unexpected very negative $\lambda_S$ through minimizing oxygen activity at a lower interface and minimizing interfacial mixing at an upper interface. As a result, in addition to adjusting the Fe content of the Co—Fe—B free layer, it is very crucial to apply these interface engineering techniques to the Co—Fe—B free layer for attaining and tuning the unexpected very negative $\lambda_S$ to a design value.

The annealing temperature used in this invention is much lower than that used in the prior art. An annealing temperature of as high as 360° C. has been considered to be very crucial in developing superior TMR properties through a transformation of an amorphous phase into a polycrystalline phase in the 60% Co-20% Fe-20% B free layer. In contrast, in the present invention, an annealing temperature of as low high as 240° C. also surprisingly causes the Co—Fe—B with Fe and B contents of much lower than 20 atomic percent to facilitate the TMR sensor to exhibit reasonably good TMR properties. Since the desired phase transformation may not occur during annealing at such a low temperature, it is speculated that a polycrystalline phase in the as-deposited Co—Fe—B free layer might be still functional in exhibiting reasonably good TMR properties, and the low annealing temperature may be just used to thermally set the magnetizations of the pinned-layer structure for measuring the TMR properties, instead of to induce the phase transformation.

TMR effects have been considered to be an interlace phenomenon in the prior art. However, it is surprising to find in the alternative embodiment that the second Co—Fe—B free layer, which is separated from the $MgO_X$ barrier layer by the first Co—Fe—B free layer, caused a substantial improvement in the TMR properties, it is thus speculated that the as-deposited, free-layer structure, comprising the first Co—Fe—B free layer with a polycrystalline phase and the second Co—Fe—B free layer with a nanocrystalline or amorphous phase, has specific tunneling scattering characteristics in maximizing the TMR effect.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A tunneling magnetoresistive sensor, comprising:
   a pinned-layer structure;
   a free-layer structure including
      a first free layer comprising an alloy selected from the group consisting of
      a Co—B alloy, and a Co—Fe—B alloy, and
      a second free layer lying on the first free layer and comprising an alloy
      selected from the group consisting of a Co—B alloy, and a Co—Fe—B alloy;
      wherein the second free layer has a B content higher than that of the first free layer.

2. A tunneling magnetoresistive sensor as in claim 1 wherein the first free layer of the free-layer structure has an Fe content of not greater than 10 atomic percent and a B content of not greater than 10 atomic percent.

3. A tunneling magnetoresistive sensor as in claim 1 wherein the second free layer of the free-layer structure has an Fe content of not greater than 20 atomic percent and a B content of not greater than 20 atomic percent.

4. A tunneling magnetoresistive sensor as in claim 1 wherein the first free layer of the free-layer structure comprises Co—Fe—B and has about 4 atomic percent Fe and about 10 atomic percent B, and the second free layer of the free-layer structure comprises Co—Fe—B and has about 8 atomic percent Fe and about 20 atomic percent B.

5. A tunneling magnetoresistive sensor as in claim 1 wherein the first free layer of the free-layer structure comprises a substantially polycrystalline phase, and the second free layer of the free-layer structure comprises an alloy having a phase selected from the group consisting of a substantially nanocrystalline phase, and a substantially amorphous phase.

6. A tunneling magnetoresistive sensor as in claim 1 further comprising a barrier layer located between the free layer structure and the pinned layer structure, the barrier layer comprising a $MgO_x$ film.

7. A tunneling magnetoresistive sensor as in claim 1 further comprising a pinning layer including an antiferromagnetic Ir—Mn—Cr alloy lying beneath the pinned-layer structure.

8. A tunneling magnetoresistive sensor as in claim 7 wherein the Ir—Mn—Cr alloy has an Ir content in the range of 16 to 28 atomic percent,
   a Mn content in the range of 70 to 80 atomic percent, and
   a Cr content of not greater than 6 atomic percent.

9. A tunneling magnetoresistive sensor as in claim 7 further comprising:
   a seed-layer structure lying beneath the pinning layer.

10. A tunneling magnetoresistive sensor as in claim 9 wherein the seed-layer structure consists of bilayers comprising Ta and Ru films.

11. A tunneling magnetoresistive sensor as in claim 1 wherein the free-layer structure has a negative saturation magnetostriction, $\lambda_s$,
   wherein $-1 \times 10^{-5} < \lambda_s < 0$.

12. A tunneling magnetoresistive sensor as in claim 11 wherein the saturation mag-netostriction, $\lambda_s$, of the free-layer structure is approximately equal to $-2 \times 10^{-6}$.

13. A magnetic disk drive, comprising:
a housing;
a magnetic disk rotatably mounted within the housing;
a slider;
an actuator connected with the slider for moving the slider adjacent to a surface of the magnetic disk; and,
a tunneling magnetoresistive sensor connected with the slider, and further comprising:
  a pinned-layer structure;
  a free-layer structure including
    a first free layer comprising an alloy selected from the group consisting of a, a Co—B alloy, and a Co—Fe—B alloy, and a second free layer lying on the first free layer and comprising an alloy selected from the group consisting of a Co—B alloy, and a Co—Fe—B alloy; wherein the second free layer has a B content higher than that of the first free layer; and,
  an electrically insulating nonmagnetic barrier layer sandwiched between the pinned-layer structure and the free-layer structure.

* * * * *